April 25, 1967 A. C. TICKLE 3,316,543

MAGNETIC THIN FILM INFORMATION SHIFTING REGISTERS

Filed Jan. 20, 1964 2 Sheets-Sheet 1

INVENTOR
ANDREW CHARLES TICKLE
BY Kane and Nydick
ATTORNEYS

INVENTOR
ANDREW CHARLES TICKLE
BY Hane and Nydick
ATTORNEYS

United States Patent Office 3,316,543

Patented Apr. 25, 1967

3,316,543

MAGNETIC THIN FILM INFORMATION SHIFTING REGISTERS

Andrew Charles Tickle, Stevenage, England, assignor to International Computers and Tabulators Limited Filed Jan. 20, 1964, Ser. No. 338,794
Claims priority, application Great Britain, Feb. 12, 1963, 5,656/63
10 Claims. (Cl. 340—174)

Figure 1:
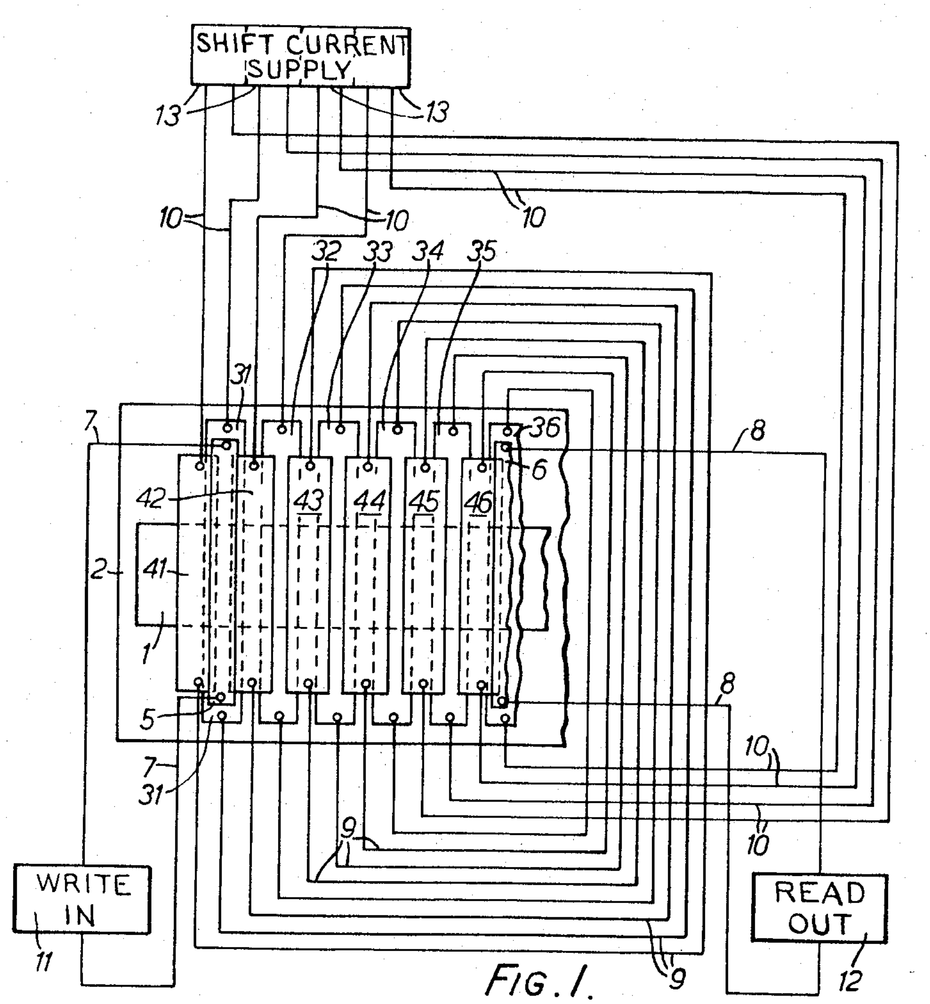

The present invention relates to information shifting registers employing thin magnetic films.

It has previously been proposed, in an article entitled, "A Thin Magnetic Film Shift Register" by K. D. Broadbent, published in I.R.E. Transactions on Electronic Computers for September 1960 by The Institute of Radio Engineers, Inc., to provide a shifting register in which an information item is represented in a continuous length of thin magnetic film as a small area of reversed magnetic state relative to the remainder of the film. This area of reversal is shifted along the film by the application of driving currents to a pattern of transverse conductors spaced along the film and magnetically linked therewith. These driving currents produce magnetic fields interacting with the film and cause movement at the boundary walls of the reversal area, thereby effectively shifting it. The transverse conductors are arranged in two similar groups and each group is formed by a continuous conductive strip that zig-zags back and forth transverse the length of film, the parts of the strip passing across the film lying parallel to one another to form the driving conductors of the group. The second group of conductors is laid over the first and conductors in the second group are displaced from those of the first group so that they cover the spaces between the conductors of the first group. Because the conductors within a group pass alternately in opposite directions across the film strip they are respectively coupled to the film in opposite senses with the result that, in order to perform the shifting operation, the driving currents are bipolar and are symmetrical, that is, the currents of either polarity are of equal amplitude. It has been found that using registers of this kind, a tendency exists for domain break-up in the reversal area. For example, irregularities in the trailing boundary wall may fail to be shifted, resulting in poor wall structure and the consequent formation of isolated areas of remanent magnetic reversal. This tendency is greatly enhanced over a number of shifting operations, to the extent that the remanent areas may grow to the point where they represent spurious information items.

It is an object of the present invention to provide an improved information shifting register in which the formation of spurious item-representing areas is inhibited.

According to the invention a thin magnetic film information shifting register includes a continuous length of anisotropic thin magnetic film having two stable states in which the magnetisation vector is aligned respectively in opposite directions substantially along the length of the film, the film initially all being in one of said states, means for switching a small area of the film to the opposite state to enter an information item into the register, at least three shifting conductor groups lying transverse the film and magnetically linked therewith, the conductors of the groups being cyclically interleaved along the film length, means for applying asymmetrical shifting current signals to the conductor groups in cyclic sequence to produce a resultant magnetic field progressing in one direction along the film length to shift the switched area, the shifting field being distributed so that the effective field acting on the leading edge of the shifted area corresponds in sign to said opposite state and has a magnitude less than that required to switch the film, and the effective field acting on the trailing edge of the shifted area corresponds in sign to the initial magnetic state of the film and has a magnitude at least sufficient to switch the film to said one state, and means for reading out the information item at a predetermined distance along the register.

Figure 3:
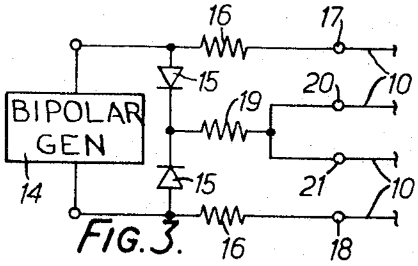
Figure 6:
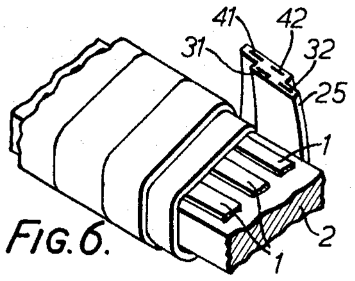
Figure 2:
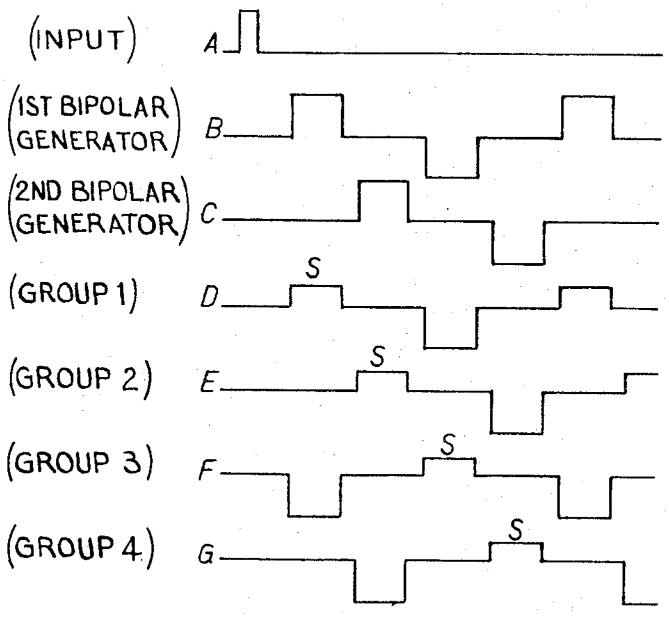
Figures 4, 5:
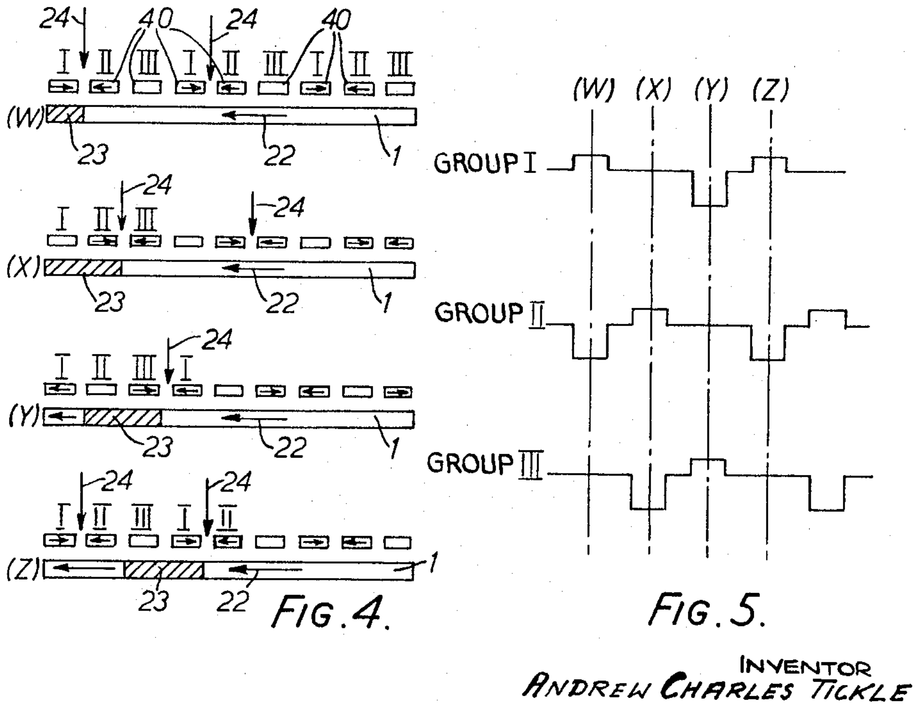

Apparatus embodying the present invention will now be described by way of example, with reference to the accompanying drawings, in which, FIGURE 1 shows diagrammatically a thin film shifting register, FIGURE 2 shows idealised driving waveforms, FIGURE 3 is a circuit diagram, FIGURE 4 is a diagrammatic representation of an alternative register, FIGURE 5 shows idealised waveforms, and FIGURE 6 shows schematically an alternative form of register construction.

Referring now to FIGURE 1, a continuous area of thin anisotropic magnetic film 1 initially all in one magnetic state is supported on a substrate 2. The film 1 is prepared in the usual manner by vacuum deposition on to the substrate in vacuo in the presence of an aligning magnetic field and has an easy axis of magnetisation substantially aligned with the long axis of the substrate. Two layers, 31 to 36 and 41 to 46 respectively, of strip conductors are arranged transverse the film. The conductors are sufficiently closely spaced to the film to be magnetically linked therewith and the conductors are insulated from each other and from the film 1. For the sake of clarity, the insulation has been omitted from the drawing but, however, it will be appreciated that insulating layers may conveniently be formed in conventional manner by evaporation in vacuo as may the strip conductors, these latter being deposited through suitable apertured masks.

In a similar manner two further strip conductors 5 and 6 respectively are provided, also linked with small areas of the film 1. The first of these conductors 5 is connected by means of lines 7 to an input or write-in circuit 11 and serves as the writing electrode. In order to enter an item of information into the register the writing electrode 5 is energized by a driving current applied over the lines 7 from the write-in circuit 11, the direction and magnitude of the item entry driving current being such that the small area of the film 1 linked with the conductor 5 is driven to saturation in a magnetic state opposite in sense to the initial state of the film.

The remaining conductor 6 is a pick-up conductor for reading purposes and is connected by means of lines 8 to an output or reading circuit 12. A change of state occurring in the area of film linked with this conductor as the result of the shifting of the area of reversal of magnetic state along the register induces a signal into the pick-up conductor 6 in the conventional manner. The reading circuit is then arranged in the normal way, to provide an electrical output signal in response to the induced signal.

Shifting of the reversal area along the register is controlled by the layers of shifting conductors 31–36, 41–46, referred to above. Conductors in the two layers are cyclically interleaved in overlapping relationship as shown in the figure. It is preferred that adjacent conductors in the succession along the register are partially overlapped, and the arrangement of the conductors in two layers in the manner shown allows this overlapping while preserving the relatively close spacing required between the conductors and the film to ensure adequate magnetic linkage therebetween and also allowing ease of manufacturing in that the conductors are easily fabricated by the deposition method referred to above. Thus, it will be appreciated that the layered arrangement of these conductors is a matter of manufacturing convenience and has no significance in considering the operation of the device.

It will be seen that the conductors are arranged in four interleaved groups. For example, the first group consists of conductors 41, 43, 45; the second group comprises conductors 31, 33, 35; the third group comprises conductors 42, 44, 46; and the fourth group include conductors 32, 34, and 36. All the conductors of a single group are connected in series by linking connections 9. Thus the successive conductors along the register are taken from the different groups in turn and the order in which they are taken is cyclically repeated so that if four adjacent conductors is considered as a set, then succeeding sets each include a conductor from each of the groups arranged in similar order.

The interconnection of the conductors of a single group by the links 9 is so arranged that a driving current applied to the group flows through all the conductors of the group in the same direction relative to the film and creates a magnetic field of the same sense acting on an area of the film.

The end conductors of the groups are respectively connected by means of lines 10 to shifting current supply sources 13, there being four such sources, one for each individual group of conductors. Each source supplies an asymmetrical bipolar shifting current pulse train and the supply of these trains to the groups of conductors is arranged in a timed cyclic sequence. The relative timings of the current pulses applied to the groups is indicated by idealised waveforms as shown in FIGURE 2, in which the polarity of a shifting current pulse corresponds to the sense of the magnetic field produced by that pulse acting on the area of film coupled to the conductor which carries the pulse. Thus, if it is assumed that an input signal indicated at A reverses the initial magnetic state of a film area to enter an information item, then the shift control pulses of like polarity occurring in the remaining waveforms of the figure also produce a reversal field. As will be seen, the pulses applied to any one group are time-spaced pulses of alternately opposite polarity. The pulses in the trains applied to successive shift control conductors of the register occur in cyclic sequence. For example, consider the current pulse of similar polarity to the input pulse in each of the waveforms, denoted S in the figure. As shown at D this pulse is applied to the first group of conductors 41, 43, 45. At the succeeding time interval the pulse S is applied to the second group 31,33, 35, as shown at E. At the next time interval a similar pulse is applied to the third group 42, 44, 46, as shown at F, and finally, as at G, the fourth group of conductors 32, 34, 36 receives a similar pulse. The entire cycle is then repeated, with the result that the pulse S is applied successively to each conductor along the film. The magnetic fields produced by the sequential application of the pulses S to the conductors act on the film and tend to shift the leading boundary of the reversal area along the register from left to right as shown in FIGURE 1. It will be recalled that the shifting control pulse train applied to each group also includes a second pulse of greater amplitude than and of opposite polarity to the pulse S. These second pulses also follow the same timing sequence but are displaced in time relative to the pulses S, and examination of the succession of shift control conductors along the register and the waveform diagram of FIGURE 2 shows that the second pulse is applied to a conductor at the time when the pulse S is applied to the next but one preceding conductor of the succession. Since the second pulses are of opposite polarity to the pulses S, it will be appreciated that the second pulses produce a resetting field behind the shifted area to restore the film to its initial magnetic state and to shift the trailing edge of the reversal area along the register in the same way that the pulses S shift the leading edge. Thus, the combined effect of the two coacting shifting fields at the leading and trailing edges of the reversal area is to shift the area of reversal bodily along the register and as the reversed area of film is shifted into the area of film linked with the conductor currently carrying the pulse S the film area behind the reversal area is subjected to a large resetting field.

The magnitude of the pulse S is such that the magnetic field produced is of insufficient magnitude to cause switching of the coupled film in the absence of a domain wall. At the same time, the pulse must be of sufficient magnitude to produce a field to cause wall motion at the leading edge of the area. The resetting field applied to the trailing edge of the reversal area, on the other hand, has an amplitude considerably larger than the maximum permissible field associated with the leading edge. The resetting field should preferably be sufficient positively to switch the coupled film to prevent small areas of reversal remaining behind the shifted reversal area. Thus, the use of these asymmetrical shifting fields, with that of the trailing edge greater than that at the leading edge prevents the formation of spurious item-representing areas in the film.

It will be realised that although the conductor pattern shown in FIGURE 1 includes only three shifting control conductors in each of the four groups, the numbers of conductors in a group may be increased as required to provide a shifting register of greater length by connecting the succeeding conductors of each group serially with those shown.

Furthermore, it will also be apparent that the conductors of a single group may be connected in parallel rather than in series as shown, although, because the shifting fields are respectively proportional to the currents flowing in the conductors, this latter arrangement requires the careful distribution of driving currents over the conductors of a group and also requires a driving current generator of greatly increased capacity.

Since any area of reversal is moved continuously along the film it will be obvious that the input electrode may be coupled to the film at any intermediate point along its length. Similarly, the output conductor may also be positioned at any required point and, indeed, several output conductors may be provided spaced along the register to provide a similar number of outputs effective in succession.

It will also be appreciated that a number of shifting registers may be provided by increasing the number of film strips on the substrate. These strips may then be arranged to lie parallel to one another and the transverse shifting control conductors may then be common to all the strips. In this way a number of independent shifting registers may be driven in synchronism by a common pattern of shift control conductors. Separate input and/or output electrodes may be provided for each of the register strips if required.

It will be appreciated that in the simplest case separate driving current generators may be provided for each of the groups of shifting control conductors. Alternatively a master driving current generator may be used together with a group of delay circuits to provide the necessary time relationship between the pulses applied to the various groups. For example, the master generator may be controlled by a source of timing signals to produce a train of pulses which are then applied to a delay line. Tappings to the delay line then provide the necessary phasing of the output signals for the various groups of conductors. A further method may be used for deriving the asymmetrical pulse trains from a conventional symmetrical bipolar pulse generator of the kind used in connection with previously known shifting registers of the kind described in the article referred to earlier, for example. In this case the output of such a generator is of the form shown at B (FIGURE 2). In the present case, using four groups of shift control conductors, two such generators would be required to produce time displaced pulse trains as indicated at B and C.

Considering a single set of conductors, one from each group, these conductors are then arranged in two interleaved pairs and one pair is associated with each generator. Thus, the first generator producing the train shown at B would be associated with the conductors of the first and third group, requiring the pulse train shown at D and F. The second generator, whose output waveform is shown at C is similarly associated with the second and fourth conductor groups, requiring the trains shown at E and G. FIGURE 3 shows the manner in which each generator is connected to the associated conductor groups and the connection of the generator having an output similar to that shown at B (FIGURE 2) will be considered.

The generator 14 (FIGURE 3) has a pair of back-to-back diodes 15 connected across its output. Resistors 16 are connected between the output of the generator and terminals 17 and 18 respectively and the junction of the diodes is connected through a resistor 19 to a pair of common return terminals 20 and 21. The first group of conductors 41, 43, 45 (FIGURE 1) is connected by the appropriate lines 10 to terminals 17 and 20 (FIGURE 3) and the third group of conductors 42, 44, 46 (FIGURE 1) is connected to the terminals 21 and 18 (FIGURE 3) respectively. Thus, assuming the conventional representation of polarity in the waveform of FIGURE 2, for example, during the positive-going cycle of the generator output represented at B, the first conductor group (D) receives a small positive pulse while the third group (F) concurrently receives a large negative pulse. During the negative-going cycle these conditions are reversed. The degree of asymmetry between the amplitudes of the positive and negative pulses in the shifting pulse trains is controlled by the choice of suitable resistance values for the resistors 16 and 19 (FIGURE 3). It will be appreciated that the polarities shown for the shifting current pulses are exemplary only and that the actual polarities are chosen to suit the direction of current flow in the shifting conductors and the required magnetic states of the film area. It will be apparent that the polarity of the current pulses may be altered by interchanging the connections of the conductor group to the pulse applying means.

The foregoing description has assumed four groups of conductors in the shifting conductor pattern. However, it will be apparent that other numbers of conductor groups may be employed. For example as few as three conductor groups may be used and FIGURES 4 and 5 show the arrangement of the groups in such a case. For simplicity, FIGURE 4 is a diagrammatic representation of a longitudinal cross section of a film strip 1 and the shifting conductors 40 only, these conductors being shown in a single layer without overlapping for ease of explanation. The conductors are arranged in ordered sequence with the group designations indicated in Roman numerals and small arrows are used to indicate the relative signs of the magnetic fields produced by energisation of the conductors by the waveforms of FIGURE 5. The initial magnetic state of the film is indicated by arrows 22 and the reversal area is indicated by the cross-hatched area shown in the film.

At W in FIGURE 4 it is assumed that a reversal area 23 has been produced in the film by the entry of an information item and the conductors are energised by pulses shown at (W) in FIGURE 5. The conductors 40 of group I are energised by the shifting pulse which is ineffective to switch a film area and the conductors 40 of group II are energised by the resetting pulse. Since the reversal area 23 underlies the extreme left-hand conductor of group I it remains unchanged.

The situation at time (X) as shown in FIGURE 5 is indicated at X in FIGURE 4. Here, the conductors of group II are energised to cause the leading edge wall of the reversal area to move to the right as shown in FIGURE 4. This has the effect of increasing the size of the reversal area. Otherwise the conditions shown at A still apply.

At time (Y) (FIGURE 5) the conductors are energised as indicated at Y (FIGURE 4). The energisation of the left-hand conductor of group III is energised to cause the leading edge wall of the reversal area 23 to move to the right as shown in FIGURE 4. At the same time the left-most conductor of group I is energised by a resetting current to cause the area underlying this conductor to switch back to the initial magnetic state and also causes the trailing edge of the reversal area 23 to take up a new position toward the right as shown in FIGURE 4.

At the time (Z) (FIGURE 5) the reversal area has moved, as shown at Z in FIGURE 4, to a position in which its leading and underlying the next conductor of group I in the succession and the area behind the trailing edge of the reversal area has once again been reset to the initial state by the energisation of the conductor group II. It will be seen that the pulse conditions at time Z are the same as those at time W. Hence, as pulses continue in cyclic sequence, the conditions shown at X, Y and Z are repeated in order and the reversal area continues to move along the film strip 1.

Comparison of the sequence of operations for three and four groups of conductors respectively shows that the mechanism of shifting is the same and that as the number of conductor groups is increased there are a correspondingly increasing number of ineffective conductors at any time during a cycle. If the length of the reversal area in the film strip 1 is maintained at the size indicated in FIGURE 3, then it is necessary that at the time when the leading edge shifting current is applied to a shifting conductor, the trailing edge resetting current is applied to the next but one preceding conductor in the sequence. If the gap between these energised conductors is increased, then the length of the reversal area will be similarly increased. It will also be apparent that as more conductor groups are introduced, the distance between possible adjacent information items is also increased, i.e., the packing density of the register is decreased.

The form of shifting register shown in FIGURE 1 is particularly suitable for production by well-known evaporation techniques. However, FIGURE 6 shows diagrammatically an alternative form of construction for shifting registers and other devices where a cyclically repeating pattern of conductors is required along an elongated strip. The strip or strips 1 are supported by a thick substrate, the thickness being sufficient to provide adequate mechanical support and to provide sufficient separation of the conductors from the film 1 on one side to prevent unwanted magnetic linkage. A single set of conductors is carried by a tape 25. The conductors are arranged in interleaved overlapping relationship in the tape as are the conductors of a single set as shown in FIGURE 1. To make the arrangement clear, the conductors carried by the tape (FIGURE 6) are referenced 31, 32, 41, 42 to correspond to the first set of conductors shown in FIGURE 1. The tape 25 (FIGURE 6) is then wound about the substrate 2 and film 1 in a close helix to provide a conductor disposition of multiple sets similar to that shown in FIGURE 1. The tape may be fabricated by, for example, first providing a strip of synthetic plastic material and forming a first layer of conductors, such as 31, 32 thereon. A second layer of plastic tape is then bound over the conductors to provide an insulating layer and the second layer of conductors, such as 41, 42, are then formed on this layer. Finally a further insulating layer of plastic may be applied on top of these conductors. The substrate 1 shown in FIGURE 6 supports a group of three film strips but it will be appreciated that more or less than this number may be used to provide a different number of shift registers.

What I claim is:

1. A thin magnetic film information shifting register including a continuous length of anisotropic thin magnetic film having two stable states in which the magnetisation vector is aligned respectively in opposite directions substantially along the length of the film, the film initially all being in one of said states, means for switching a small area of the film to the opposite state to enter an information item into the register, at least three shifting conductor groups lying transverse the film and magnetically linked therewith the conductors of the groups being cyclically interleaved along the film length, means for applying asymmetrical shifting current signals to the conductor groups in cyclic sequence to produce a resultant magnetic field progressing in one direction along the film length to shift the switched area, the shifting field being distributed so that the effective field acting on the leading edge of the shifted area corresponds in sign to said opposite state and has a magnitude less than that required to switch the film, and the effective field acting on the trailing edge of the shifted area corresponds in sign to the initial magnetic state of the film and has a magnitude at least sufficient to switch the film to said one state, and means for reading out the information item at a predetermined distance along the register.

2. Apparatus as claimed in claim 1, in which the shifting conductors of the groups are arranged in succession along the film in similar sets, each set comprising a conductor from each of the groups in turn, and in which adjacent conductors are partially overlapped.

3. Apparatus as claimed in claim 2, in which the asymmetrical shifting current signals comprise bipolar current pulse trains in which pulses of opposite polarity are respectively of unequal amplitudes, and in which the pulses in similar trains applied to different conductor groups are in predetermined time relationship to each other.

4. Apparatus as claimed in claim 3, in which the time relationships of the pulse trains are such that at the time when the conductors of any one group have applied to them a current pulse of polarity and amplitude to produce a magnetic field corresponding to said effective field acting on the leading edge of the area, the next but one preceding conductors of the succession form a group concurrently having applied to them a current pulse of polarity and amplitude to produce a magnetic field corresponding to said effective field acting on the trailing edge of the area.

5. Apparatus as claimed in claim 4, in which the shifting conductors are arranged in four groups, all the conductors of a group being electrically connected in series.

6. Apparatus as claimed in claim 5, in which separate means is provided for applying a bipolar asymmetrical shifting current pulse train to each group.

7. Apparatus as claimed in claim 6, in which the shifting conductors of a set comprise two interleaved pairs and in which the means for applying a bipolar current to the groups associated with a pair of conductors include a distributing network common to the pair of groups and connected to a single source of symmetrical bipolar current pulses.

8. Apparatus as claimed in claim 7, in which the distributing network includes a pair of back-to-back diodes connected across said source, resistors respectively connected in series with one supply connection to each group and a common return connection from the pair of groups connected in series with a further resistor to the junction of the diodes.

9. Apparatus as claimed in claim 1, in which said means to enter an information item includes a further conductor arranged transverse the film area and magnetically linked with an area of the film and means for energising said further conductor with a current pulse of polarity and amplitude to produce a magnetic field effective to switch the linked area to said opposite state.

10. Apparatus as claimed in claim 9, in which said means for reading out the item includes a pick-up conductor arranged transverse the film and magnetically linked with the film, the pick-up conductor being spaced from said further conductor by said predetermined distance in the direction of shifting, and means responsive to a signal induced in said pick-up conductor by the passage of the shifted area along the register to produce an electrical output signal.

References Cited by the Examiner

UNITED STATES PATENTS

| | | | |
|---|---|---|---|
| 2,919,432 | 12/1959 | Broadbent | 340—174 |
| 3,068,453 | 12/1962 | Broadbent | 340—174 |
| 3,176,276 | 3/1965 | Smith | 340—174 |
| 3,241,126 | 3/1966 | Snyder | 340—174 |
| 3,248,713 | 4/1966 | Middelhoek | 340—174 |
| 3,248,716 | 4/1966 | Snyder | 340—174 |

BERNARD KONICK, *Primary Examiner.*

S. M. URYNOWICZ, *Assistant Examiner.*